United States Patent
Miyazaki

(10) Patent No.: US 7,432,337 B2
(45) Date of Patent: Oct. 7, 2008

(54) RUBBER COMPOSITION FOR COATING A CARCASS CORD AND A CARCASS CORD COATED THEREBY

(75) Inventor: Tatsuya Miyazaki, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 90 days.

(21) Appl. No.: 11/415,126

(22) Filed: May 2, 2006

(65) Prior Publication Data

US 2006/0266459 A1    Nov. 30, 2006

(30) Foreign Application Priority Data

May 25, 2005    (JP)    ............... 2005-152795

(51) Int. Cl.
*C08F 36/06* (2006.01)
*C08F 36/08* (2006.01)

(52) U.S. Cl. .................. 526/335; 526/337; 152/532; 152/537

(58) Field of Classification Search ................. 526/335, 526/337; 152/532, 537
See application file for complete search history.

(56) References Cited

U.S. PATENT DOCUMENTS 5,252,405 A    10/1993   Kaido et al.
6,138,731 A  * 10/2000   Miyazaki et al. ............ 152/532
6,310,144 B1   10/2001   Inui et al.
2004/0144468 A1   7/2004   Mizuno et al.

FOREIGN PATENT DOCUMENTS

| EP | 0 602 861 A2 | 6/1994 |
| EP | 0 610 070 A1 | 8/1994 |
| EP | 0 675 161 A1 | 3/1995 |
| EP | 0 714 928 A2 | 6/1996 |
| JP | 60-193701 A | 10/1985 |
| JP | 63-134309 A | 6/1988 |
| JP | 63-203404 A | 8/1988 |
| JP | 3-137141 A | 6/1991 |
| JP | 11-60819 A | 3/1999 |
| JP | 11-80432 A | 3/1999 |

* cited by examiner

*Primary Examiner*—Ling-Siu Choi
(74) *Attorney, Agent, or Firm*—Birch, Stewart, Kolasch and Birch, LLP

(57) ABSTRACT

The present invention provides a rubber composition for coating carcass cord improving adhesive property to the carcass cord and further suppressing the crack growth, heat generation and lowering of rubber property, and a carcass cord coated thereby. A rubber composition for coating carcass cord comprising 3 to 10 parts by weight of zinc oxide, 0.5 to 5 parts by weight of resorcin condensate or modified resorcin condensate and 0.5 to 5 parts by weight of partial condensate of hexamethylol melamine pentamethyl ether or partial condensate of hexa methoxy methylol melamine based on 100 parts by weight of a rubber component comprising 40 to 80% by weight of natural rubber or isoprene rubber, 10 to 30% by weight of butadiene rubber and 10 to 40% by weight of styrene butadiene rubber.

4 Claims, No Drawings

RUBBER COMPOSITION FOR COATING A CARCASS CORD AND A CARCASS CORD COATED THEREBY

BACKGROUND OF THE INVENTION

The present invention relates to a rubber composition for coating a carcass cord for coating the reinforcing cord of carcass and a carcass cord coated thereby.

Tire cords such as a steel cord are used at tire parts such as carcass, as a cord reinforcing the tire parts. However, since the reinforcing cord and the tire parts are easily peeled by running, higher adhesion strength to the reinforcing cord is required in the rubber composition for coating a carcass cord.

In order to improve the adhesive property between the reinforcing cord and tire parts, comprising large amounts of sulfur for the tire parts can be used. But, since free sulfur cuts sulfur crosslinking between rubber chains, and rubber main chains by using large amounts of sulfur, the tire parts are easily broken and there has been a problem that locally large tensile deformation is generated in the reinforcing cord at running on unpaved road surface and at running after storing tires in wet environment.

Also, Japanese Unexamined Patent Publication No. 2004-217817 discloses a rubber composition comprising a compound capable of donating a methylene group and a resin comprising resorcin (refer to the Japanese Unexamined Patent Publication No. 2004-217817). But when the rubber composition is used for coating carcass cord, the adhesive property between the carcass cord and the rubber composition is insufficient and there have been problems that the rubber composition generates heat or generates cracking.

SUMMARY OF THE INVENTION

It is the purpose of the present invention to provide a rubber composition for coating carcass cord improving adhesive property to the carcass cord and further suppressing the crack growth, heat generation and lowering of rubber property, and a carcass cord coated thereby.

The present invention relates to a rubber composition for coating carcass cord comprising 3 to 10 parts by weight of zinc oxide, 0.5 to 5 parts by weight of resorcin condensate or modified resorcin condensate and 0.5 to 5 parts by weight of partial condensate of hexamethylol melamine pentamethyl ether or partial condensate of hexa methoxy methylol melamine based on 100 parts by weight of a rubber component comprising 40 to 80% by weight of natural rubber or isoprene rubber, 10 to 30% by weight of butadiene rubber and 10 to 40% by weight of styrene butadiene rubber.

Also, the present invention relates to a carcass cord coated with a carcass comprising said rubber composition.

DETAILED DESCRIPTION

According to the present invention, there can be provided a rubber composition for coating carcass cord improving adhesive property to the carcass cord, suppressing the crack growth, heat generation and lowering of rubber property and further improving processability at kneading by a roll, by comprising a rubber component comprising the specific amounts of natural rubber or isoprene rubber, styrene butadiene rubber and butadiene rubber respectively and specific amounts of zinc oxide, together with the specific amounts of resorcin condensate or modified resorcin condensate and partial condensate of hexamethylol melamine pentamethyl ether or partial condensate of hexa methoxy methylol melamine; and a carcass cord coated with a carcass comprising said rubber composition for coating carcass cord.

The rubber composition for coating carcass cord of the present invention comprises a rubber component, zinc oxide, resorcin condensate or modified resorcin condensate and partial condensate of hexamethylol melamine pentamethyl ether or partial condensate of hexa methoxy methylol melamine.

The rubber component comprises natural rubber (hereinafter referred to as NR) or isoprene rubber (hereinafter referred to as IR), butadiene rubber (hereinafter referred to as BR) and styrene butadiene rubber (hereinafter referred to as SBR). By the way, NR, IR, BR and SBR are not specifically limited and those which are generally used in the rubber industry can be used.

The content of NR or IR in the rubber component is at least 40% by weight, preferably at least 50% by weight. When the content of NR or IR is less than 40% by weight, the rubber composition is fractured at tire running by being brought in contact with roughness and foreign articles of road surface. Also, the content of NR or IR in the rubber component is at most 80% by weight, preferably at most 75% by weight. When the content of NR or IR is more than 80% by weight, reversion is generated at high temperature, weakening of a polymer structure by transferring 100% cis-structure to trans-structure is further generated and rubber properties such as tensile strength at break and elongation at break are lowered.

The content of BR in the rubber component is at least 10% by weight, preferably at least 12% by weight. When the content of BR is less than 10% by weight, crack easily grows (inferior in crack growth resistance) and durability of a tire is lowered. Also, the content of BR in the rubber component is at most 30% by weight, preferably 25% by weight. When the content of BR is more than 30% by weight, processability is inferior since winding to a roll is lowered in the kneading steps of the rubber composition by an open roll and the like.

The content of SBR in the rubber component is at least 10% by weight, preferably at least 15% by weight. When the content of SBR is less than 10% by weight, adhesive property between the rubber composition and the carcass cord, and durability of a tire is lowered. Also, the content of SBR in the rubber component is at most 40% by weight, preferably at most 35% by weight. When the content of SBR is more than 40% by weight, heat generation property of the rubber composition is high, and adhesive property, tensile strength at break, elongation at break and durability of a tire are inferior.

As zinc oxide, those which are generally used in the rubber industry, such as zinc oxide such as GINREI R available from Toho Zinc Co., Ltd., can be used.

The rubber composition for coating carcass cord of the present invention, which is required superior adhesive property to the carcass cord, comprises preferably large amounts of zinc oxide.

With respect to zinc oxide, after the carcass cord is coated with the rubber composition, a zinc component dispersed in a nano scale appears in the form of zinc oxide or zinc sulfide accompanies with sulfur on the surface of the carcass cord at a vulcanizing step.

Further, sulfur and the zinc component on the surface of the carcass cord form a film having high hardness at the adhesive layer between the carcass cord and the rubber composition, lowers modulus difference between the carcass cord and the rubber composition and play a role of heightening durability of a tire.

However, since dispersibility of zinc oxide is inferior to that of carbon black and zinc oxide becomes the origin of crack in the rubber composition, comprising large amounts of zinc oxide was difficult.

In the present invention, comprising specific contents of BR in the rubber component in particular with zinc oxide enables comprising large amounts of zinc oxide.

The amount of zinc oxide is at least 3 parts by weight, preferably at least 5 parts by weight, based on 100 parts by weight of the rubber component. When the amount of zinc oxide is less than 3 parts by weight, adhesive layer formed between the carcass cord and the rubber composition is insufficient and durability of a tire is inferior. Also, the amount of zinc oxide is at most 10 parts by weight, preferably at most 8 parts by weight, based on 100 parts by weight of the rubber component. When the amount of zinc oxide is more than 10 parts by weight, processability of kneading in producing the rubber composition is lowered and durability of a tire which is obtained using the rubber composition for coating carcass is lowered.

Resorcin condensate is a compound represented by the following formula. Wherein n is an integer of at least 1.

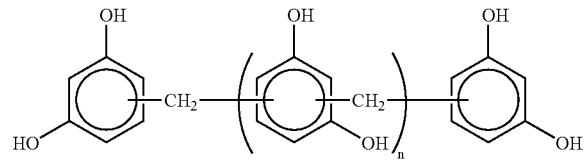

Also, modified resorcin condensate is a compound represented by the following formula. Wherein n is an integer. Also, in the following formula, R is preferably an alkyl group. Examples of modified resorcin condensate are resorcin-alkyl phenol-formalin copolymer (Sumikanol 620 available from Taoka Chemical Co., Ltd.), resorcinol-formaldehyde resin (1319S available from Indspec Co.).

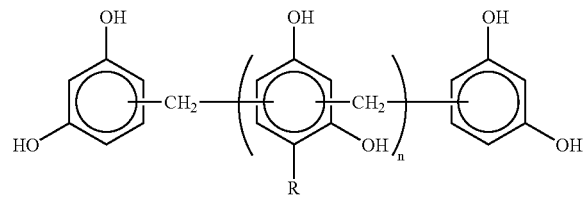

The amount of resorcin condensate or modified resorcin condensate is at least 0.5 part by weight, preferably 1 part by weight, based on 100 parts by weight of the rubber component. When the amount of resorcin condensate or modified resorcin condensate is less than 0.5 part by weight, crosslinking density is not sufficient and hardness of the rubber composition obtained is low. Also, the amount of resorcin condensate or modified resorcin condensate is at most 5 parts by weight, preferably at most 2% by weight. When the amount of resorcin condensate or modified resorcin condensate is more than 5 parts by weight, heat generation is increased and cost is increased.

The present invention can sufficiently suppress heat generation which becomes a problem for the rubber composition for coating carcass cord, by comprising resorcin condensate or modified resorcin condensate as essential in combination with the rubber component and zinc oxide. The present invention can show more superior performance than a rubber composition in which a cresol resin represented by the following formula is comprised in place of resorcin condensate or modified resorcin condensate, by comprising resorcin condensate or modified resorcin condensate in the rubber composition.

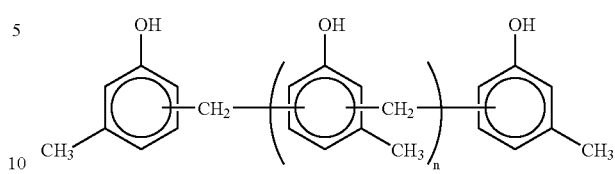

Partial condensate of hexamethylol melamine pentamethyl ether (HMMPME) refers to the compound represented by the following formula. Wherein n is an integer of at least 1, and the number range of n is usually 1 to 3.

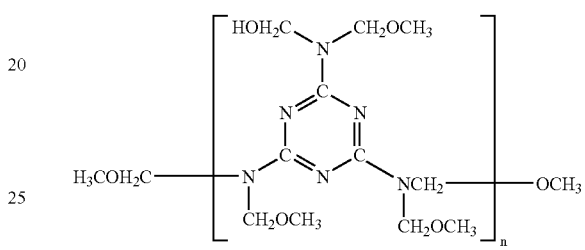

Partial condensate of hexa methoxy methylol melamine (HMMM) refers to the compound represented by the following formula. Wherein n is an integer of at least 1, and the number range of n is usually 1 to 3.

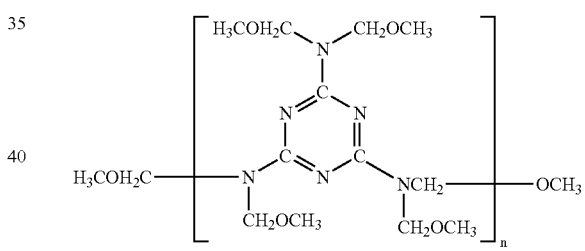

The amount of partial condensate of HMMPME or partial condensate of HMMM is at least 0.5 part by weight, preferably at least 0.6 part by weight, more preferably at least 1 part by weight, based on 100 parts by weight of the rubber component. When the amount of partial condensate of HMMPME or partial condensate of HMMM is less than 0.5 part by weight, hardness of the rubber composition obtained is low. Also, the amount of partial condensate of HMMPME or partial condensate of HMMM is at most 3 parts by weight, preferably at most 2.5 parts by weight. When the amount is more than 3 parts by weight, heat generation is increased and cost is heightened.

To the rubber composition for coating carcass cord of the present invention, sulfur can be comprised additionally.

As sulfur, sulfur that is usually used in the rubber industry when vulcanizing can be used. Among sulfur, insoluble sulfur is preferably used in particular. Herein, insoluble sulfur means sulfur which is obtained by heating natural sulfur $S_8$, rapid cooling it and polymerizing it to be Sx (x=100000 to 300000). Blooming which usually occurs at using sulfur as a rubber vulcanizing agent can be prevented by using the insoluble sulfur.

The amount of sulfur (pure sulfur amount excluding oil amount when insoluble sulfur is used) is preferably at least 2 parts by weight, more preferably at least 2.4 parts by weight, based on 100 parts by weight of the rubber component. When the amount of sulfur is less than 2 parts by weight, sulfur is not sufficiently supplied to the plating layer of the carcass cord and adhesive property tends to be inferior. Also, the amount of sulfur is preferably at most 4 parts by weight, more preferably 3.5 parts by weight. When the amount of sulfur is more than 4 parts by weight, the sulfur crosslinking density becomes large and rubber properties such as resistant at break and elongation at break tend to be low.

The rubber composition for coating the carcass cord of the present invention does not preferably comprise organic acid cobalt since main chains in rubbers such as NR and SBR is cut to promote thermally oxidation and degradation of the rubber.

To the rubber composition of the present invention, besides the rubber component, zinc oxide, resorcin condensate or modified resorcin condensate, partial condensate of HMMPME or partial condensate of HMMM and sulfur, reinforcing agents such as carbon black and silica, antioxidants, softeners, stearic acid, vulcanization accelerators can be suitably comprised.

As antioxidants, amine ketone type antioxidants, bisphenol type antioxidants, polyphenol type antioxydants, aromatic secondary amine type antioxydants, thiourea type antioxidants can be used. Among these antioxidants, amine ketone type antioxidants (NOCRAC 224 and the like) are preferably used from the view point that adhesion between fiber cord and the rubber composition is not prevented.

The rubber composition of the present invention is used as carcass among tire parts. After the carcass cord is coated with the rubber composition to form a carcass, an unvulcanized tire is molded by combining it with other fire parts and then a pneumatic tire can be prepared by vulcanization. There are advantages in that a good adhesive property of the carcass cord with the rubber composition is obtained by using the rubber composition of the present invention not for other parts but for the carcass and the rubber composition can withstand some thermal degradation.

The carcass cord of the present invention is either of carcass steel cord or carcass fiber cord.

A carcass steel cord is a steel cord coated with a carcass comprising said rubber composition.

Also, a carcass fiber cord is a fiber cord coated with a carcass comprising said rubber composition. Hereat, a fiber cord is obtained by raw materials such as polyester, nylon, rayon and polyethylene terephthalate. Among above raw materials, a carcass fiber cord using polyester is preferable from the viewpoint of its excellent thermal stability and its inexpensive price.

The carcass cord of the present invention is preferably a carcass fiber cord from the viewpoint that excellent adhesive property can be kept even if under vulcanizing at high temperature (the surface of the fiber cord is treated with resorcinol-formaldehyde).

The carcass cord of the present invention can be used not only as tires for automobiles, but also as tires for light truck since superior adhesive property and fracture property can be exhibited by using it.

EXAMPLES

The present invention is explained in detail based on Examples, but the present invention is not limited thereto.

The various chemicals used in Examples and Comparative Examples of the present invention are described below.
Natural rubber (NR): RSS#3
Styrene butadiene rubber (SBR): NIPOL 1502 available from Zeon Co.
Butadiene rubber (BR): BR150B available from Ube Industries Ltd.
Zinc oxide: GINREI R available from Toho Zinc Co., Ltd.
Antioxidant: NOCRAC 224 (amine-ketone type) available from Ouchi Shinko Chemical Industrial Co., Ltd.
Carbon black: SHOBLACK N330 available from Showa Cabot K. K.
Modified resorcin condensate: SUMIKANOL 620 available from Taoka Chemical Co., Ltd.
Partial condensate of hexamethylol melamine pentamethyl ether (HMMPME): Effective resin component (n=1 to 3 in the following formula) of SUMIKANOL 507A (mixture of about 65% of substances having a methylene group, silica and oil) available from Taoka Chemical Co., Ltd.

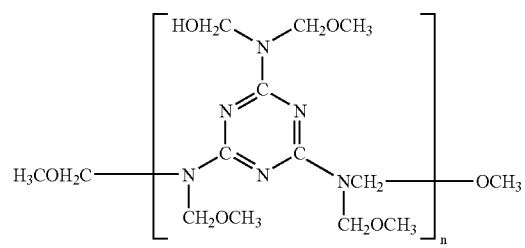

Metacresol resin: SUMIKANOL 610 available from Taoka Chemical Co., Ltd.
Insoluble sulfur: SEIMISULFUR (10% oil treated, pure sulfur content: at least 60%) available from Nippon Kanryu Industry Co., Ltd.
Aroma oil: PROCESS X-140 available from Japan Energy Co.
Stearic acid: TSUBAKI available from Nihon Oil & Fat Co., Ltd.
Vulcanization accelerator NS: NOCCELER NS (N-tert-butyl-2-benzothiazolylsulfenamide) available from Ouchi Shinko Chemical Industrial Co., Ltd.

Examples 1 to 5 and Comparative Examples 1 to 11

(Preparation of Rubber Test Piece)

According to the amounts shown in Table 1 and 2, the various chemicals other than sulfur and the vulcanization accelerator were kneaded by a Banbury mixer. According to the amounts shown in Table 1 and 2, sulfur and the vulcanization accelerator were added to the obtained kneaded rubber and the mixture was kneaded with an open roll to obtain unvulcanized rubber compositions. The unvulcanized rubber compositions were vulcanized at 170° C. for 12 minutes to prepare rubber sheets for test and the following tests were conducted using the obtained rubber sheets for test.

Also, in the kneading step using the open roll, winding property of the unvulcanized rubber compositions on the roll and so on was visually evaluated. Then, the indexation (roll workability index) of the values was conducted respectively, regarding the value of Comparative Example 2 as 100. The larger the index is, the superior the workability is, since kneading using the open roll proceeds more smoothly.

<Viscoelasticity Test>

Loss tangent tan δ of the rubber sheet at 70° C. was measured using a viscoelasticity spectrometer made by Iwamoto Quarts GlassLab Co., Ltd. under the conditions of frequency of 10 Hz, the initial strain of 10% and dynamic strain of 2% using the rubber sheets for test, which were thermally oxidized and degraded under the condition of 170° C. for 12 minutes. The smaller the value of tan δ is, the better the low heat generation property is because of low heat generation.

<Tensile Test (Tensile Strength at Break and Elongation at Break)>

According to JIS K 6251, tensile test was conducted using No. 3 dumbbell type rubber sheets for test, which were thermally oxidized and degraded under the condition of 170° C. for 12 minutes, and the tensile strength at break and elongation at break of test pieces were respectively measured.

<Crack Growth Test>

According to JIS K 6301, bending crack growth test was conducted using the rubber sheets for test, which were thermally oxidized and degraded under the condition of 170° C. for 12 minutes. The rubber sheets for test were bent by repeating 70% tension 300000 times and then the length of cracks generated was measured. Then, the reciprocal numbers of the measured values were calculated. Furthermore, the indexation (crack growth resistance index) of the reciprocal numbers was conducted respectively, regarding the reciprocal number of Comparative Example 2 as 100. The larger the index is, the superior the crack growth resistance is.

(Producing a Carcass Which Coats Fiber Cord)

Fiber cord which formed a resorcin resin film on the surface by immersing fiber cord (POLYESTER (raw material: terephthalic acid and ethylene glycol) available from Teijin Limited) in a mix solution of resorcinol and formaldehyde was coated with the unvulcanized rubber composition, and after unvulcanized carcass was molded, it was used for producing tires.

<Adhesion Test>

Adhesion test was conducted and the peeling resistance between carcass and fiber cord was measured using a tensile tester (available from Instron Inc.). Furthermore, the indexation (adhesion property index) of the measured value was conducted respectively, regarding the measured value of Comparative Example 2 as 100. The larger the index is, the superior the adhesion property between carcass and cord is.

(Producing a Tire Having a Carcass Which Coats Fiber Cord)

After unvulcanized carcass is formed by coating a fiber cord with the unvulcanized rubber composition, the unvulcanized carcass was laminated together with other tire parts to form an unvulcanized tire and the unvulcanized tire was vulcanized to prepare a truck tire for a commercial car (tire size: 225/70R16 117/115). The following test was conducted.

<High Load Durability Test on Drum>

The running distance until swelling of bead or tread occurred, when the tire was run on a drum at a speed of 20 km/h under the conditions of maximum load (maximum inner pressure condition) by JIS standard of 230%, was measured. Furthermore, the indexation (high load durability index) of the measured value was conducted respectively, regarding the measured value of Comparative Example 2 as 100. The larger the index is, the superior the durability of bead or tread is.

The evaluation results above tests are shown in Tables 1 and 2.

TABLE 1

|  | Ex. | | | | Com. Ex. | | | | | | | |
| --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 |
| Composition (parts by weight) | | | | | | | | | | | | |
| NR | 60 | 40 | 70 | 60 | 100 | 70 | 100 | 70 | 80 | 90 | 30 | 40 |
| SBR | 25 | 30 | 15 | 15 | — | 30 | — | 30 | — | 5 | 40 | 50 |
| BR | 15 | 30 | 15 | 25 | — | — | — | — | 20 | 5 | 30 | 10 |
| Zinc oxide | 6 | 6 | 6 | 6 | 6 | 6 | 2.5 | 2.5 | 6 | 6 | 6 | 6 |
| Antioxidant | 1 | 1 | 1 | 1 | 1 | 1 | 1 | 1 | 1 | 1 | 1 | 1 |
| Carbon black | 45 | 45 | 45 | 45 | 45 | 45 | 45 | 45 | 45 | 45 | 45 | 45 |
| Modified resorcin condensate | 1 | 1 | 1 | 1 | 1 | 1 | 1 | 1 | 1 | 1 | 1 | 1 |
| Partial condensate of HMMPME | 1.5 | 1.5 | 1.5 | 1.5 | 1.5 | 1.5 | 1.5 | 1.5 | 1.5 | 1.5 | 1.5 | 1.5 |
| Insoluble sulfur (having 10% of oil) | 3.3 | 3.3 | 3.3 | 3.3 | 3.3 | 3.3 | 3.3 | 3.3 | 3.3 | 3.3 | 3.3 | 3.3 |
| Aroma oil | 9 | 9 | 9 | 9 | 9 | 9 | 9 | 9 | 9 | 9 | 9 | 9 |
| Stearic acid | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 |
| Evaluation results | | | | | | | | | | | | |
| tanδ | 0.12 | 0.13 | 0.12 | 0.12 | 0.12 | 0.12 | 0.13 | 0.15 | 0.12 | 0.12 | 0.15 | 0.16 |
| Adhesion property index | 110 | 80 | 100 | 110 | 80 | 100 | 60 | 70 | 70 | 75 | 80 | 70 |
| Crack growth resistance index | 2000 | 3000 | 2000 | 2500 | 60 | 100 | 120 | 200 | 2000 | 200 | 2000 | 500 |
| Tensile strength at break (MPa) | 22 | 20 | 21 | 22 | 23 | 23 | 22 | 22 | 23 | 23 | 20 | 19 |
| Elongation at break (%) | 460 | 400 | 480 | 470 | 450 | 400 | 460 | 450 | 460 | 450 | 390 | 400 |
| High load durability index | 200 | 120 | 170 | 220 | 90 | 100 | 95 | 100 | 60 | 90 | 60 | 50 |
| Roll workability index | 100 | 120 | 80 | 80 | 90 | 100 | 90 | 100 | 20 | 95 | 70 | 100 |

TABLE 2

|  | Ex. | | Com. Ex. | | |
| --- | --- | --- | --- | --- | --- |
|  | 1 | 5 | 9 | 10 | 11 |
| Composition (parts by weight) | | | | | |
| NR | 60 | 60 | 60 | 60 | 60 |
| SBR | 25 | 25 | 25 | 25 | 25 |
| BR | 15 | 15 | 15 | 15 | 15 |

TABLE 2-continued

|  | Ex. | | Com. Ex. | | |
| --- | --- | --- | --- | --- | --- |
|  | 1 | 5 | 9 | 10 | 11 |
| Zinc oxide | 6 | 6 | 6 | 6 | 12 |
| Antioxidant | 1 | 1 | 1 | 1 | 1 |
| Carbon black | 45 | 45 | 45 | 45 | 45 |
| Modified resorcin condensate | 1 | 2 | — | — | 1 |
| Partial condensate of HMMPME | 1.5 | 3 | 1.5 | 3 | 1.5 |
| Metacresol resin | — | — | 1 | 2 | — |
| Insoluble sulfur (pure sulfur component) | 3.3 | 3.3 | 3.3 | 3.3 | 3.3 |
| Aroma oil | 9 | 9 | 9 | 9 | 9 |
| Stearic acid | 2 | 2 | 2 | 2 | 2 |
| Vulcanization accelerator | 1 | 1 | 1 | 1 | 1 |
| Evaluation results | | | | | |
| tanδ | 0.12 | 0.11 | 0.16 | 0.15 | 0.115 |
| Adhesion property index | 110 | 120 | 110 | 120 | 120 |
| Crack growth resistance index | 2000 | 500 | 2500 | 600 | 500 |
| Tensile strength at break (MPa) | 22 | 24 | 23 | 25 | 22 |
| Elongation at break (%) | 460 | 360 | 510 | 430 | 460 |
| High load durability index | 200 | 100 | 150 | 70 | 70 |
| Roll workability index | 100 | 100 | 100 | 100 | 100 |

What is claimed is:

1. A rubber composition for coating a carcass cord comprising 3 to 10 parts by weight of zinc oxide, 0.5 to 5 parts by weight of resorcin condensate or modified resorcin condensate and 0.5 to 5 parts by weight of partial condensate of hexamethylol melamine pentamethyl ether or partial condensate of hexa methoxy methylol melamine based on 100 parts by weight of a rubber component comprising 40 to 80% by weight of natural rubber or isoprene rubber, 10 to 30% by weight of butadiene rubber and 10 to 40% by weight of styrene butadiene rubber.

2. A carcass cord coated with a carcass comprising the rubber composition of claim 1.

3. A tire having a carcass formed from a carcass cord coated with the rubber composition of claim 1.

4. The tire of claim 3, wherein the rubber component of the rubber composition comprises 50 to 75% by weight of natural rubber or isoprene rubber, 12 to 25% by weight of butadiene rubber and 15 to 35% by weight of styrene butadiene rubber.

* * * * *